US009346281B2

(12) United States Patent
Okuno et al.

(10) Patent No.: US 9,346,281 B2
(45) Date of Patent: May 24, 2016

(54) LIQUID SUPPLY UNIT AND LIQUID EJECTION DEVICE

(71) Applicant: SEIKO EPSON CORPORATION, Tokyo (JP)

(72) Inventors: Tokujiro Okuno, Kitakyushu (JP); Hitotoshi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/754,412

(22) Filed: Jun. 29, 2015

(65) Prior Publication Data

US 2016/0001567 A1 Jan. 7, 2016

(30) Foreign Application Priority Data

Jul. 1, 2014 (JP) .................................. 2014-135648

(51) Int. Cl.
| | |
|---|---|
| *B41J 2/175* | (2006.01) |
| *B05B 1/30* | (2006.01) |
| *F16K 1/00* | (2006.01) |
| *F16K 31/126* | (2006.01) |

(52) U.S. Cl.
CPC .......... *B41J 2/17596* (2013.01); *B41J 2/17509* (2013.01); *F16K 31/1266* (2013.01); *B41J 2002/17516* (2013.01)

(58) Field of Classification Search
CPC .... B41J 2/17509; B41J 2/175; B41J 2/17596; B41J 2002/17516; B41J 2/18; F16K 31/1266
USPC .................. 347/84–86, 89; 239/586; 251/331
See application file for complete search history.

(56) References Cited

U.S. PATENT DOCUMENTS

| | | | |
|---|---|---|---|
| 2005/0219281 A1 | 10/2005 | Seino et al. | |
| 2006/0108004 A1 | 5/2006 | Nakamura | |
| 2006/0203045 A1 | 9/2006 | Kobayashi et al. | |
| 2009/0179974 A1 | 7/2009 | Kimura | |
| 2012/0038719 A1 | 2/2012 | Shimizu et al. | |
| 2015/0108257 A1* | 4/2015 | Okui .................... | B05B 1/3013 239/586 |

FOREIGN PATENT DOCUMENTS

| | | |
|---|---|---|
| JP | 2006-142215 | 6/2006 |
| JP | 2006-212845 A | 8/2006 |
| JP | 2007-083548 | 4/2007 |
| JP | 2009-190395 A | 8/2009 |
| JP | 2011-230513 A | 11/2011 |
| JP | 2012-051308 A | 3/2012 |

* cited by examiner

*Primary Examiner* — An Do

(74) *Attorney, Agent, or Firm* — Workman Nydegger

(57) ABSTRACT

A liquid supply unit includes a pressure adjusting valve portion that includes a liquid outlet connectable to an upstream end of a supply passage, which supplies liquid to a liquid ejection head, a liquid inlet that draws in the liquid from a liquid supply source containing the liquid, a pressure chamber at least partially formed by a flexible portion configured to be deformed when the pressure changes, an urging member configured to urge the flexible portion in a direction in which the flexible portion increases a volume of the pressure chamber, and an opening-closing valve configured to allow the liquid to be drawn from the liquid supply source to the pressure chamber through the liquid inlet in accordance with a deformation of the flexible portion.

14 Claims, 7 Drawing Sheets

LIQUID SUPPLY UNIT AND LIQUID EJECTION DEVICE

The entire disclosure of Japanese Patent Application No. 2014-135648, filed Jul. 1, 2014, is expressly incorporated by reference herein.

BACKGROUND

1. Technical Field

The present invention relates to a liquid ejection device, such as an inkjet printer, and a liquid supply unit included in the liquid ejection device to supply liquid.

2. Related Art

A known example of a liquid ejection device is an inkjet printer that includes a liquid ejection head arranged on a carriage that traverses, or scans, a recording medium. The inkjet printer ejects ink, which is an example of the liquid, toward the recording medium from nozzle openings in the liquid ejection head. Such a printer includes, for example, a liquid supply source formed by a container. The liquid supply source includes an atmospheric communication passage. The printer supplies liquid from the liquid supply source to the liquid ejection head through a liquid passage. The printer adjusts the hydraulic head difference between the position of the nozzle openings in the liquid ejection head and the position of the surface of the liquid that contacts the atmosphere in the liquid supply source. This stabilizes the supply of liquid (e.g., JP-A-2012-51308).

To obtain a hydraulic head difference that allows liquid to be stably supplied from the liquid supply source to the liquid ejection head, when the liquid supply source is, for example, a container including the atmospheric communication passage, the surface of the liquid in the liquid supply source that is in contact with the atmosphere needs to be lower than the nozzle openings of the liquid ejection head. Thus, the container forming the liquid supply source cannot be a large-capacity container that includes an atmospheric communication passage when there is a possibility of the surface of the liquid, which is in contact with the atmosphere in the container, becoming higher than the nozzle openings. Further, the container forming the liquid supply source cannot be a tall and flexible when the container is sealed. Thus, a user cannot freely select the liquid supply source.

SUMMARY

An advantage of some aspects of the invention is to provide a liquid supply unit and a liquid ejection device that stably supply liquid from a liquid supply source to a liquid ejection head without limitations in capacity and form of the liquid supply source.

The means for solving the above problem and the operation will now be described.

According to one aspect of the invention, a liquid supply unit includes a pressure adjusting valve portion and is configured to be connectable to a supply passage that supplies liquid to a liquid ejection head including a nozzle opening from which the liquid is ejected. The pressure adjusting valve portion includes a liquid outlet connectable to an upstream end of the supply passage, a liquid inlet that draws in the liquid from a liquid supply source, which contains the liquid, a pressure chamber connected to the liquid outlet and the liquid inlet and at least partially formed by a flexible portion configured to be deformed when pressure of the pressure chamber changes, an urging member configured to urge the flexible portion in a direction in which the flexible portion increases a volume of the pressure chamber, and an opening-closing valve configured to allow the liquid to be drawn from the liquid supply source to the pressure chamber through the liquid inlet in accordance with a deformation of the flexible portion.

According to another aspect of the invention, a liquid ejection device includes the liquid supply unit configured in the above manner and a liquid ejection unit including the above liquid ejection head.

Other aspects and advantages of the present invention will become apparent from the following description, taken in conjunction with the accompanying drawings, illustrating by way of example the principles of the invention.

BRIEF DESCRIPTION OF THE DRAWINGS

The invention will be described with references to the accompanying drawings, wherein like numbers reference like elements.

DESCRIPTION OF EXEMPLARY EMBODIMENTS

First Embodiment

A first embodiment of a liquid ejection device including a liquid supply unit will now be described with reference to FIGS. 1 to 4. As one example of the liquid ejection device, the embodiment is applied to an inkjet printer that performs printing by ejecting ink, which is an example of the liquid, to a target, such as paper.

Figure 1:
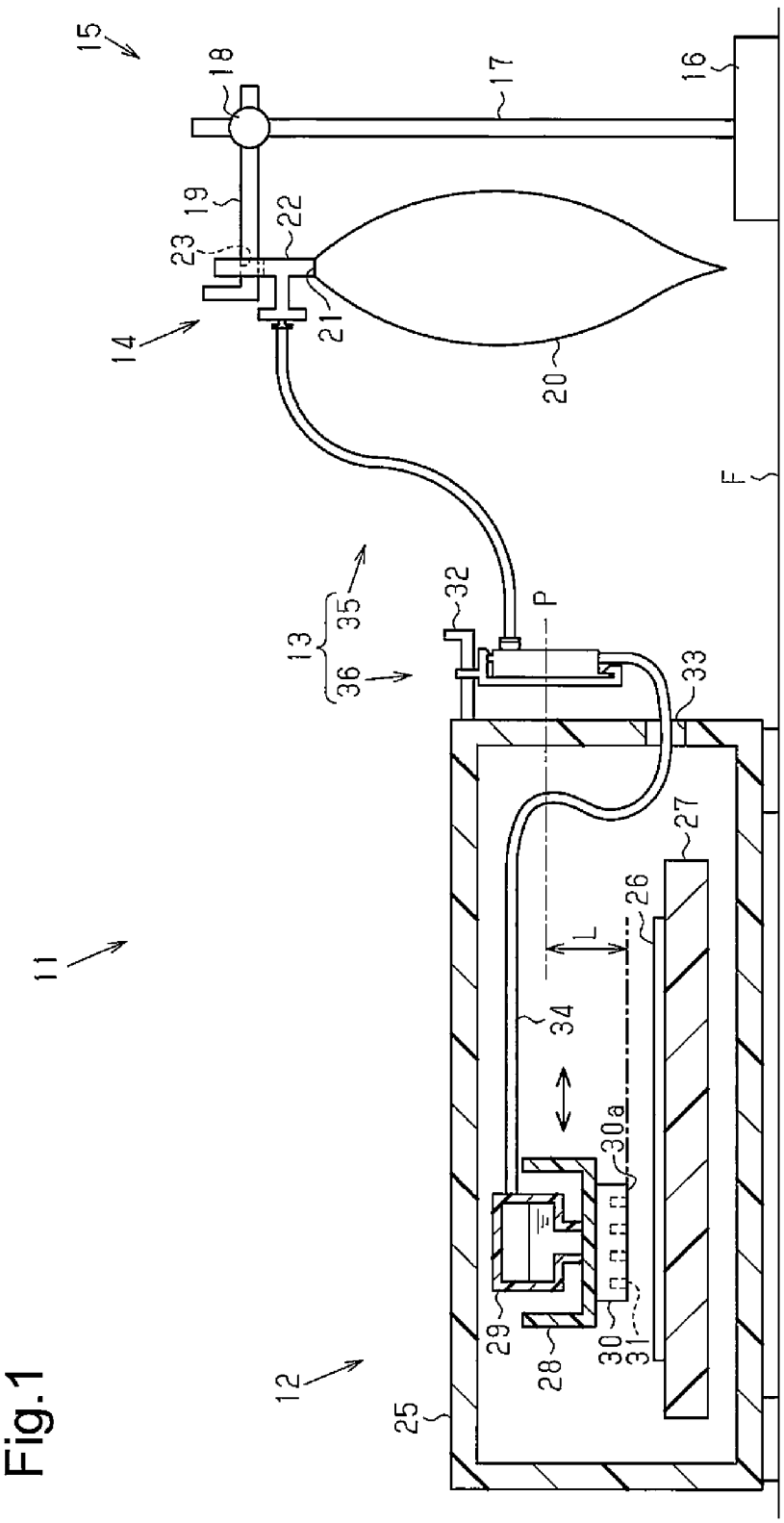
FIG. 1 is a schematic diagram of a first embodiment of a liquid ejection device and a liquid supply source.

As shown in FIG. 1, a liquid ejection device 11 includes a device body 12, located on a floor F, and a liquid supply unit 13, located outside the device body 12. The device body 12 functions as a liquid ejection unit. On the floor F, a support device 15 is located beside the liquid ejection device 11. The support device 15 supports an ink pack 14, which is an example of a liquid supply source for the liquid ejection device 11. The support device 15 includes a base 16 located on the floor F and a post 17 extending vertically upward from the center of the base 16. The post 17 includes an upper portion that includes a holding metal piece 18. The holding metal piece 18 holds a support arm 19 on the post 17 at a predetermined height. The support arm 19 is generally L-shaped and extends in the horizontal direction. The ink pack 14 is hung from and supported by the support arm 19.

The ink pack 14 is a sealed flexible container, which is bag-shaped and formed from a flexible film. The ink pack 14 includes a pack body 20, the shape of which elastically changes as the amount of liquid (ink) decreases or increases in the ink pack 14. The pack body 20 includes an opening 21. The opening 21 is attached to a liquid supply port formation member 22 having a fixed shape. The liquid supply port formation member 22 includes a hole 23, through which the support arm 19 of the support device 15 may be inserted. When the support arm 19 is inserted through the hole 23, the ink pack 14 is supported by the support device 15 so that the pack body 20 is extended in the vertical direction when hung.

In a situation such as that shown in FIG. 1, the position of a pressure hydraulic head of the liquid contained in the ink pack 14 substantially conforms to the position where the pack body 20 is most bulged in the horizontal direction. When the liquid contained inside is discharged to the exterior through the liquid supply port formation member 22, the most bulged position of the pack body 20 shifts downward. Accordingly, the position of the pressure hydraulic head is shifted downward.

When the pack body 20 of the ink pack 14 is excessively filled with liquid, a reaction force of the film (force that increases the pressure of the ink pack 14) acts to deform the ink pack 14 in a direction in which the volume of the ink pack 14 decreases. Thus, the initial position of the pressure hydraulic head is higher than the most bulged position of the pack body 20 in the horizontal direction. When the liquid is discharged out of the pack body 20 of the ink pack 14 through the liquid supply port formation member 22 and the liquid becomes nearly depleted, the reaction force of the film (force that decreases the pressure of the ink pack 14) acts to deform the ink pack 14 in a direction in which the volume of the ink pack 14 increases. In this case, the position of the pressure hydraulic head is lower than the most bulged position of the pack body 20 in the horizontal direction.

As shown in FIG. 1, the device body 12 of the liquid ejection device 11 includes a case 25, which is generally box-shaped. The case 25 accommodates a support member 27 at a low position. The support member 27 is capable of supporting paper 26, which is an example of a target that is transported by a transport device (not shown) in a predetermined direction (direction orthogonal to the plane of FIG. 1). Also, the case 25 accommodates a carriage 28, which is located above the support member 27 and reciprocally movable relative to the paper 26 in a main scanning direction (sideward direction in FIG. 1). The carriage 28 includes an upper portion, on which a liquid reservoir 29 capable of storing liquid is located. The carriage 28 includes a lower portion, on which a liquid ejection head 30 that ejects liquid is located.

The liquid ejection head 30 includes a lower surface that is opposed to an upper surface of the support member 27. The lower surface of the liquid ejection head 30 includes a plurality of nozzle openings 31 (FIG. 1 shows four nozzle openings 31 in broken lines). The nozzle openings 31 eject liquid toward the paper 26 supported by the support member 27. That is, the lower surface of the liquid ejection head 30 defines a nozzle formation surface 30a that includes the nozzle openings 31, which eject liquid. A liquid passage (not shown) is formed in the liquid ejection head 30. Liquid is supplied through the liquid passage to the nozzle openings 31, which open in the nozzle formation surface 30a, from the liquid reservoir 29, which is located above the nozzle openings 31.

When the liquid is supplied from the liquid reservoir 29 to the nozzle openings 31 through the liquid passage, a meniscus is formed in each nozzle opening 31. The meniscus is the curved surface of the liquid that is formed when contacting a solid surface (in this case, wall surface of the nozzle opening 31) due to the difference of the adhesive force acting between the solid molecules and the liquid molecules and the cohesion force between liquid molecules. In this case, the liquid has a concave surface, which is recessed toward an inner side of the nozzle opening 31.

If the liquid is ink, taking into consideration the surface tension of the ink, when the diameter of each nozzle opening 31 is 20 to 30 μm, the withstanding pressure of the meniscus formed in the surface of the liquid in the nozzle opening 31 (gas liquid interface) may be converted to capillary force. The capillary force in height is calculated to be approximately 500 mm. However, to stably eject the ink from each nozzle opening 31, it is preferred that the position of the pressure hydraulic head of the supplied ink be set in a range from +100 mm to −300 mm of (from 100 mm higher to 300 mm lower than) the position of the nozzle openings 31 in the vertical direction. Further preferably, the position of the pressure hydraulic head of the supplied ink is set in a range from −50 mm to +200 mm.

As shown in FIG. 1, the case 25 includes a side wall (right side wall in FIG. 1) having an outer surface. The outer surface of the side wall includes an upper portion including a hook 32. The side wall also includes a lower portion including a through hole 33. The hook 32, which is located at an outer side of the case 25, stably holds the liquid supply unit 13. A liquid supply tube 34 functions as a liquid supply passage. The liquid supply tube 34 is inserted through the through hole 33, which extends through the side wall of the case 25. The liquid supply tube 34 is a flexible tubular member. The liquid supply tube 34 includes one end functioning as an upstream end and another end functioning as a downstream end. The upstream end is located outside the case 25 and connected to the liquid supply unit 13. The downstream end is located inside the case 25 and connected to the liquid reservoir 29. When the downstream side of the liquid supply tube 34 is, for example, bent and moved in the case 25 in accordance with the movement of the carriage 28, the upstream side of the liquid supply tube 34 remains still together with the liquid supply unit 13 outside the case 25.

As shown in FIG. 1, the liquid supply unit 13 includes a liquid guide 35 and a pressure adjusting valve portion 36. The liquid supply unit 13 is located between the ink pack 14 and the liquid ejection head 30. The liquid supply unit 13 functions to supply liquid from the ink pack 14 toward the liquid ejection head 30. The liquid guide 35 functions to supply the liquid supply unit 13 with the liquid drawn from the ink pack 14. The pressure adjusting valve portion 36 functions to adjust the pressure of the liquid (hereafter, also referred to as "liquid pressure"), which has been drawn through the liquid guide 35, and discharge the liquid toward the liquid ejection head 30.

Figure 2:
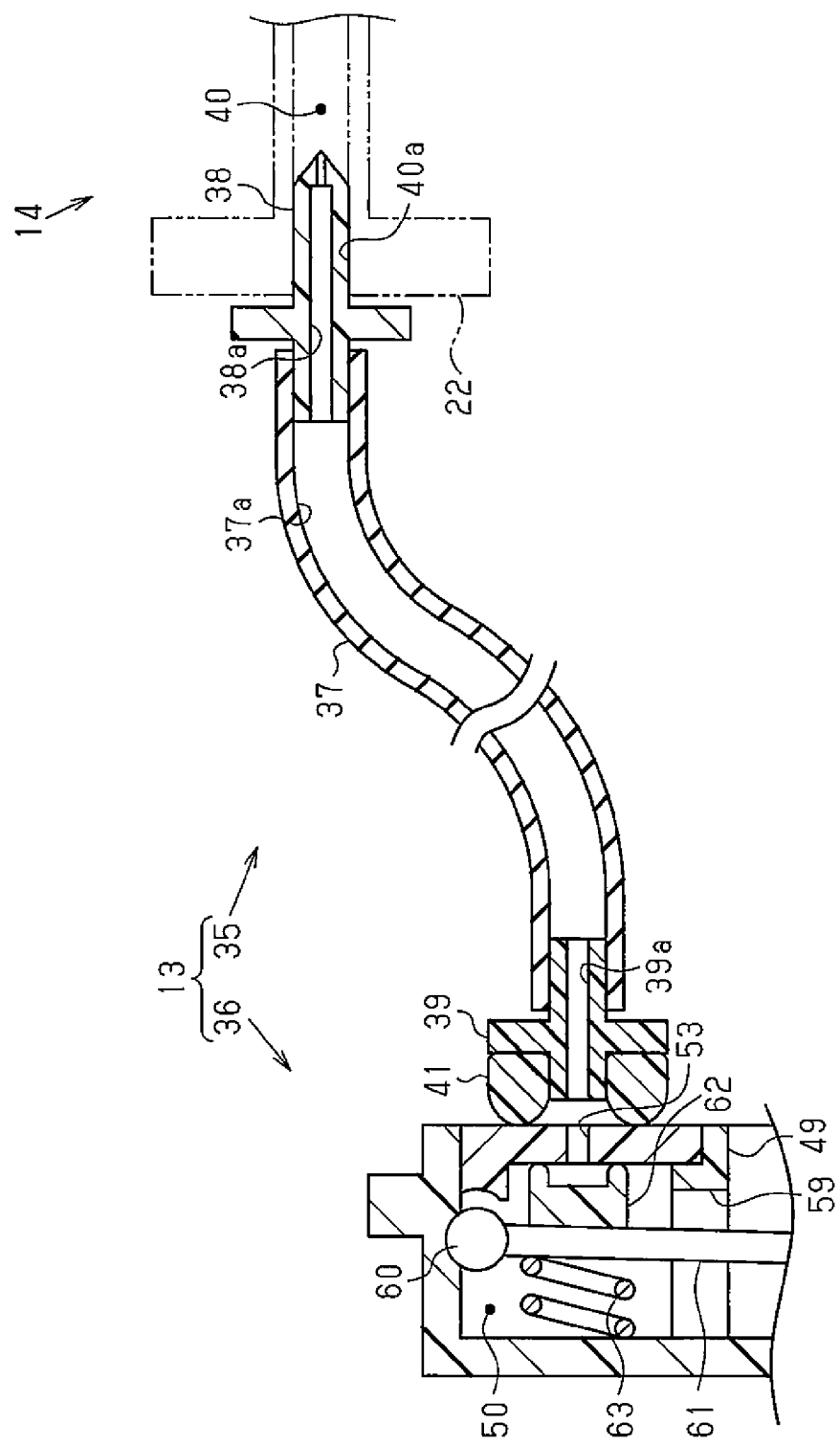
FIG. 2 is a schematic cross-sectional view of a liquid guide of a liquid supply unit shown in FIG. 1.

As shown in FIG. 2, the liquid guide 35 of the liquid supply unit 13 includes a liquid guide tube 37, which is a flexible tubular member (tube), a liquid supply needle 38 attached to an upstream end of the tube 37, and a relay member 39 attached to a downstream end of the tube 37. The liquid supply needle 38 includes a flow passage 38a extending along the axis of the liquid supply needle 38. Also, the relay member 39 includes a flow passage 39a extending along the axis of the relay member 39. The flow passages 38a, 39a are connected to a flow passage 37a formed in the liquid guide tube 37 to form a series of the flow passages.

Additionally, as shown in FIG. 2, the liquid supply port formation member 22 of the ink pack 14 includes a liquid discharge passage 40, through which the liquid is discharged from the pack body 20. The liquid discharge passage 40 includes a downstream end opening that defines a liquid supply port 40a. The distal end of the liquid supply needle 38, which functions as a liquid discharge member, is inserted into the liquid supply port 40a. In this manner, when the distal end of the liquid supply needle 38 is inserted into the liquid supply port 40a, the liquid discharged from the pack body 20 of the ink pack 14 is drawn downstream through the flow passage 38a of the liquid supply needle 38, the flow passage 37a of the liquid guide tube 37, and the flow passage 39a of the relay member 39 into the pressure adjusting valve portion 36.

More specifically, in the present embodiment, just by inserting the distal end of the liquid supply needle 38 of the liquid guide 35 into the liquid supply port 40a of the ink pack 14, liquid is allowed to be easily drawn from the ink pack 14 to the pressure adjusting valve portion 36. Additionally, the liquid guide tube 37 of the liquid guide 35 is a flexible tube. Thus, the shape of the flow passage may be changed in correspondence with the location of the liquid supply port 40a of the ink pack 14 regardless of the size and shape of the ink pack 14. An annular seal member 41 is attached to a portion of the relay member 39 located at a side opposite to the liquid guide tube 37. The seal member 41 surrounds a downstream side opening of the flow passage 39a of the relay member 39.

Figure 3:
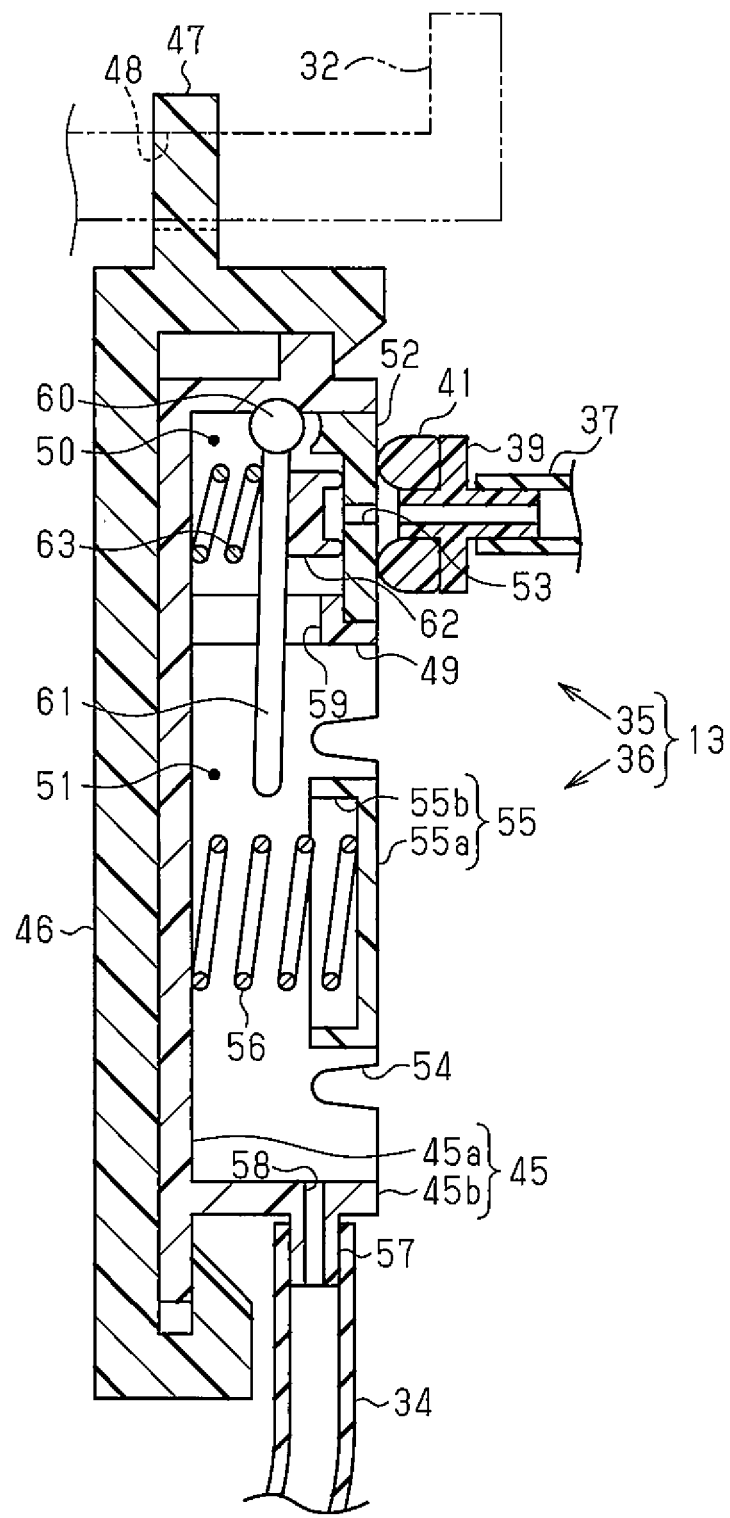
FIG. 3 is a schematic cross-sectional view of a pressure adjustment valve portion of the liquid supply unit shown in FIG. 1.

As shown in FIG. 3, the pressure adjusting valve portion 36 includes a valve body 45 and a holder 46. The valve body 45 draws liquid from the ink pack 14 and discharges the liquid toward the liquid ejection head 30. The holder 46, which holds the valve body 45, is hooked on the hook 32 of the case 25. The holder 46 is case-shaped to receive the valve body 45. The holder 46 includes a projection 47, which projects from a portion (upper portion in FIG. 3) of the holder 46. A through hole 48 extends through the projection 47. When the hook 32 is inserted through the through hole 48, the holder 46 holds the valve body 45, which is coupled below the projection 47, at a predetermined heightwise position P at which a hydraulic head difference L is produced between the valve body 45 and the nozzle openings 31 of the liquid ejection head 30 in the vertical direction. In this case, the value of L is set so that a desirable meniscus may be formed in each nozzle opening 31.

The valve body 45, which is box-shaped and has a closed end, includes an end plate 45a, a peripheral wall 45b, and a partition wall 49. The partition wall 49 divides an inner portion of the valve body 45 into a liquid guide chamber 50, which has a relatively small volume, and a pressure chamber 51, which has a relatively large volume. The liquid guide chamber 50 includes an opening that is located at a side opposite to the end plate 45a and closed by a cover 52. The cover 52 includes a liquid inlet 53, which connects the liquid guide chamber 50 to the outside. The cover 52 is coupled to the annular seal member 41, which has been described above in relation with the liquid guide 35. The seal member 41 surrounds the opening of the liquid inlet 53 at the side of the cover 52 opposite to the liquid guide chamber 50.

The pressure chamber 51 of the valve body 45 includes an opening, which is located at a side opposite to the end plate 45a and closed by a film member 54. The film member 54 is an example of a flexible portion. The film member 54 is a thin film formed from a flexible material, such as a synthetic resin or rubber. The film member 54 forms a portion of the pressure chamber 51 (in this case, wall surface opposed to the end plate 45a of the pressure chamber 51). The film member 54 is bent and deformed so that the volume of the pressure chamber 51 increases or decreases when liquid is drawn into or discharged from the pressure chamber 51. The heightwise position P of the film member 54, which is bent and deformed, relative to the vertical heightwise position of the nozzle openings 31 of the liquid ejection head 30 is maintained in a range in which the liquid may form a meniscus in each nozzle opening 31. For example, when the position of the pressure adjusting valve portion 36 is as shown in FIG. 3, the heightwise position P is located at a vertically middle portion of the film member 54.

The film member 54 includes a surface opposed toward the pressure chamber 51 (i.e., inner surface). A cylindrical pressure receiving member 55 having a closed end is arranged at the inner surface. The pressure receiving member 55 includes an end plate 55a and a peripheral wall 55b. The pressure receiving member 55 is arranged to allow an outer surface of the end plate 55a to contact the inner surface of the film member 54. A coil spring 56 is located between an inner surface of the end plate 55a of the pressure receiving member 55 and an inner surface of the end plate 45a of the valve body 45. The coil spring 56 is an example of an urging member that urges the film member 54, with the pressure receiving member 55 located in between, in a direction in which the film member 54 increases the volume of the pressure chamber 51. When urged by the coil spring 56, an outer surface of the end plate 55a contacts the inner surface of the film member 54. The urging force of the coil spring 56 is adjusted so that the pressure chamber 51 has a slightly negative pressure, which functions as a back pressure applied to the nozzle openings 31 in a direction in which the liquid is supplied. This forms uniform menisci in the nozzle openings 31 and stabilizes the operation of ejecting the liquid.

As shown in FIG. 3, the peripheral wall 45b of the valve body 45 includes a wall portion opposed to the partition wall 49 with the pressure chamber 51 located in between. The wall portion includes a cylinder 57 projecting out of the valve body 45. The cylinder 57 includes a liquid outlet 58 extending along the axis of the cylinder 57. The liquid outlet 58 connects the pressure chamber 51 to the outside of the pressure chamber 51. The cylinder 57, through which the liquid outlet 58 extends, is connected to the upstream end of the liquid supply tube 34.

A communication hole 59 extends through the partition wall 49 of the valve body 45 and connects the liquid guide chamber 50 to the pressure chamber 51. A pivot shaft 60 is arranged on the inner surface of the liquid guide chamber 50 at a location opposed to the communication hole 59 of the partition wall 49. The basal portion of a lever 61 is fixed to the pivot shaft 60. The lever 61 is pivotal about the pivot shaft 60. The lever 61 has a length set so that the distal portion of the lever 61 extends through the communication hole 59 of the partition wall 49 and into the pressure chamber 51. More specifically, as shown in FIG. 3, the lever 61 has a length set so that the distal portion of the lever 61 is opposed to the peripheral wall 55b of the pressure receiving member 55 in a direction in which the coil spring 56 expands and contracts.

A valve 62 is formed from an elastic material such as rubber. The valve 62 is coupled to a portion of the lever 61 located in the liquid guide chamber 50 at the side opposed to the liquid inlet 53. Additionally, in the liquid guide chamber 50, a coiled seal spring 63 is located between the end plate 45a of the valve body 45 and a portion of the lever 61 opposite to where the valve 62 is coupled. The seal spring 63 urges the lever 61 in a direction in which the valve 62 contacts the cover 52, that is, in a valve-closing direction in which the liquid inlet 53 is closed.

The operation of the liquid supply unit 13 and the liquid ejection device 11 including the liquid supply unit 13 will now be described with reference to the drawings.

Here, it is assumed that the pressure chamber 51 of the pressure adjusting valve portion 36 in the liquid supply unit 13 is filled with liquid, which has been drawn from the ink pack 14 through the liquid guide 35, the liquid inlet 53, the liquid guide chamber 50, and the communication hole 59. Under this condition, the pressure receiving member 55 is as shown in FIG. 3. More specifically, a slightly negative pressure is applied to the liquid in the pressure chamber 51. The combined force of the negative pressure and the urging force of the coil spring 56 is balanced with the atmospheric pressure, and the film member 54 is urged away from the end plate 45a of the valve body 45. Thus, the pressure receiving member 55 is separated from the distal portion of the lever 61. Additionally, the seal spring 63 urges the lever 61 so that the valve 62 contacts the cover 52 and closes the liquid inlet 53.

Since the liquid inlet 53 is closed by the valve 62 of the pressure adjusting valve portion 36, the liquid stops flowing from the ink pack 14 toward the liquid ejection head 30. Thus, leakage of the liquid from the nozzle openings 31 may be limited even when the position of the pressure hydraulic head of the liquid contained in the ink pack 14 is located at a position higher than the nozzle openings 31 in the vertical direction, and the hydraulic head difference is greater than the withstanding pressure of menisci formed in the nozzle openings 31, for example, when the ink pack 14 includes a pack body 20 having a large capacity. Additionally, when the ink pack 14 is a sealed flexible container and the liquid becomes nearly depleted, a reaction force of the film acts to deform the ink pack 14 in a direction in which the volume of the ink pack 14 increases. This increases the negative pressure of the ink pack 14. Consequently, the menisci formed in the nozzle openings 31 would receive negative pressure that is greater than the withstanding pressure of the menisci. Even in such a case, the liquid inlet 53, which is closed by the valve 62, limits a reverse flow of the liquid that would be caused by a negative pressure.

In the pressure adjusting valve portion 36, when the liquid inlet 53 is closed by the valve 62, the liquid stops flowing from the ink pack 14 toward the liquid ejection head 30. Thus, for example, even when the liquid supply tube 34 is disconnected from the cylinder 57 of the pressure adjusting valve portion 36, the leakage of liquid from the liquid outlet 58 of the pressure adjusting valve portion 36 is limited, and the intake of air that would be caused by the pressure of the liquid contained in the ink pack 14 is limited.

Under this condition, as shown in FIG. 1, when liquid is ejected from the nozzle openings 31 of the liquid ejection head 30 toward the paper 26 placed on the support member 27, an amount of liquid consumed by the ejection is discharged from the pressure chamber 51 through the liquid outlet 58 and supplied to the liquid ejection head 30 through the liquid supply tube 34 and the liquid reservoir 29. Consequently, the discharging of the liquid causes the pressure of the liquid in the pressure chamber 51 to become further negative and less than the slightly negative pressure.

Then, the difference between the further negative pressure of the liquid in the pressure chamber 51 and the atmospheric pressure, acts to bend the film member 54, which forms the wall surface of the pressure chamber 51, in a direction in which the film member 54 decreases the volume of the pressure chamber 51. When the bending force exceeds the urging force of the coil spring 56, the film member 54 is deformed and bent toward the inner side of the pressure chamber 51. As a result, the pressure receiving member 55 is moved toward the inner side of the pressure chamber 51 together with the film member 54 while contracting the coil spring 56.

Figure 4A:
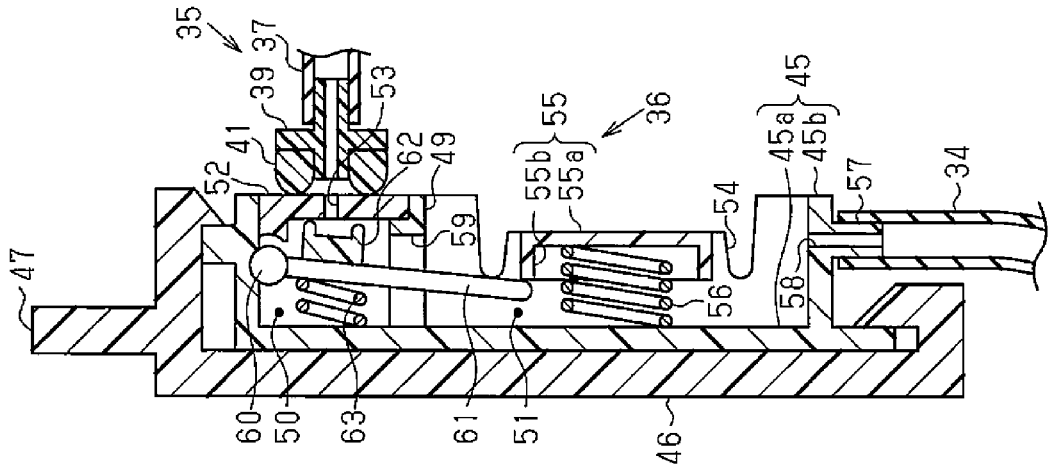
FIG. 4A is a schematic cross-sectional view of the pressure adjustment valve portion of the liquid supply unit shown in FIG. 3 showing a shift operation.
Figure 4B:
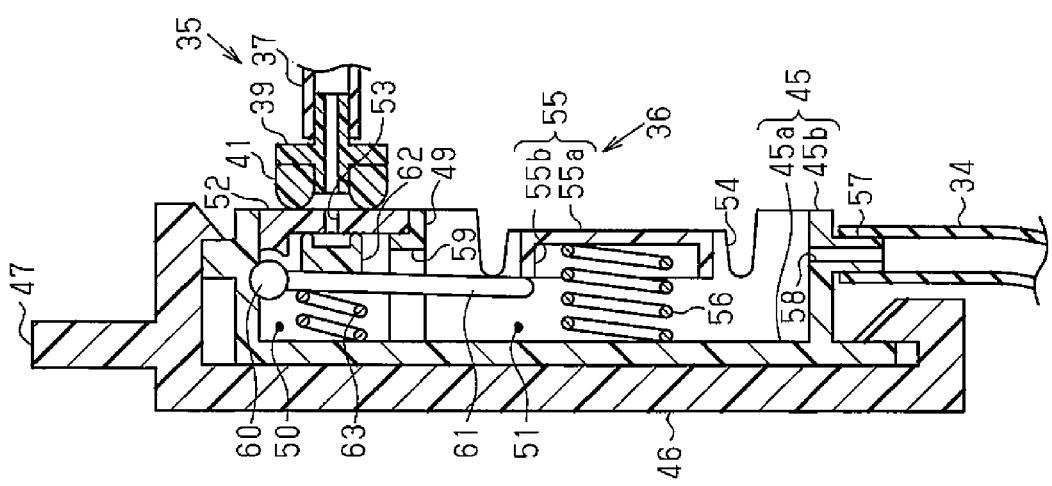
FIG. 4B is a schematic cross-sectional view of the pressure adjustment valve portion of the liquid supply unit shown in FIG. 3 showing a shift operation.

Consequently, as shown in FIG. 4A, in the pressure chamber 51, the peripheral wall 55b of the pressure receiving member 55 contacts the distal portion of the lever 61. Then, as shown in FIG. 4B, as the discharging of the liquid further continues and further decreases the pressure of the liquid in the pressure chamber 51, the film member 54 is further deformed and bent toward the inner side of the pressure chamber 51. This moves the pressure receiving member 55 further into the pressure chamber 51 and further contracts the coil spring 56. As a result, the lever 61, which is pressed by the greatly moved pressure receiving member 55, pivots about the pivot shaft 60. More specifically, the lever 61 pivots in a direction in which the valve 62 is separated from the cover 52, that is, a valve-opening direction in which the valve 62 opens the liquid inlet 53.

Consequently, liquid is drawn from the ink pack 14 into the liquid guide chamber 50 through the open liquid inlet 53. Then, the liquid is drawn from the liquid guide chamber 50 into the pressure chamber 51 through the communication hole 59.

The drawing of the liquid into the pressure chamber 51 deforms and bends the film member 54 in a direction in which the film member 54 increases the volume of the pressure chamber 51. As a result, the urging force of the coil spring 56 moves the pressure receiving member 55 in a direction in which the pressure receiving member 55 is separated from the lever 61. Then, the urging force of the seal spring 63 causes the lever 61 to pivot again in a direction in which lever 61 closes the valve 62. Thus, the pressure adjusting valve portion 36 is returned to the state shown in FIG. 4A.

In this manner, when the ejection of liquid from the liquid ejection head 30 consumes the liquid in the pressure chamber 51, the pressure adjusting valve portion 36 repeats the states of FIGS. 4A and 4B. As a result, the liquid pressure of the pressure chamber 51 is maintained at a predetermined pressure that is lower than the atmospheric pressure when opening the valve 62 attached to the lever 61.

The predetermined pressure may be changed by setting the urging force of the coil spring 56, the force needed to deform the film member 54, the force needed to deform and close a seal portion of the valve 62, the urging force of the seal spring 63, the distance between the pivot shaft 60 of the lever 61 and the valve 62, and the distance between the pivot shaft 60 and the distal portion of the lever 61, which contacts the pressure receiving member 55.

For example, when the position of the pressure adjusting valve portion 36 is as shown in FIG. 3, and the above predetermined pressure is converted into a value in pressure hydraulic head, the converted value may correspond to a position that is lower than the position P by 100 mm in the vertical direction. In this case, even when the position P is higher than the position of the nozzle openings 31 by 50 mm in the vertical direction (L=50 mm), and the pressure of the supplied ink is converted into a value in pressure hydraulic head, the converted value corresponds to a position that is lower than the position of the nozzle openings 31 by 50 mm in the vertical direction.

In this regard, in the present embodiment, the valve 62 attached to the lever 61 functions as an opening-closing valve. The opening-closing valve moves in accordance with the deformation of the film member 54, which functions as the flexible portion, and allows liquid to be drawn from the ink pack 14 into the pressure chamber 51 through the liquid inlet 53.

The first embodiment has the advantages as follows.

(1) The pressure adjusting valve portion 36, which functions to adjust the pressure of liquid, is located between the ink pack 14 (liquid supply source) and the liquid ejection head 30. Thus, the ink pack 14 may be located without considering the difference in height from the position of the nozzle openings 31 of the liquid ejection head 30. Even in this case, the operation of the pressure adjusting valve portion 36 limits leakage of the liquid from the nozzle openings 31 and abnormal supply of the liquid to the liquid ejection head 30. Thus, the liquid may be stably supplied from the ink pack 14 to the liquid ejection head 30 without limitations in the capacity and form of the ink pack 14.

(2) The pressure adjusting valve portion 36 successively supplies the liquid toward the liquid ejection head 30 in accordance with the amount of the liquid ejected from the liquid ejection head 30. This allows a negative pressure to be maintained in the pressure chamber 51 and acts as the back pressure of the nozzle openings 31, while limiting breakage of the liquid menisci in the nozzle openings 31. Thus, the liquid menisci may be stably formed in the nozzle openings 31. This maintains a constant quality in the ejection performance of the liquid ejection head 30.

(3) The liquid may be easily drawn from the ink pack 14 (liquid supply source) to the pressure adjusting valve portion 36 just by inserting the liquid supply needle (liquid discharge member) of the liquid guide 35 into the liquid supply port 40*a* of the ink pack 14.

(4) The liquid guide 35 functions as a flow passage, through which the liquid is drawn from the ink pack (liquid supply source) to the pressure adjusting valve portion 36. The liquid guide 35 includes the liquid guide tube 37, which is flexible. This allows the flow passage to have any shape when connected to the liquid supply port 40*a* of the ink pack 14. Thus, the ink pack 14 may have any shape and be located at any position.

(5) The pressure adjusting valve portion 36 draws liquid into the pressure chamber 51, the wall surface of which is partially formed by the flexible film member 54, and discharges the liquid out of the pressure chamber 51. The pressure adjusting valve portion 36 is maintained at the predetermined heightwise position in which the positional relationship is unvaried between the pressure adjusting valve portion 36 and the nozzle openings 31 of the liquid ejection head 30. This prevents an unstable shifting of the position of the pressure adjusting valve portion 36. Thus, the liquid may be stably supplied from the pressure adjusting valve portion 36 to the liquid ejection head 30. This allows the liquid in the nozzle openings 31 to stably form menisci.

(6) The downstream end of the liquid guide 35 is connected to the liquid inlet 53 of the pressure adjusting valve portion 36 by the seal member 41. Thus, when the liquid is supplied from the ink pack 14 to the pressure adjusting valve portion 36, leakage of the liquid may be limited. Also, entry of bubbles and foreign materials from the exterior may be limited.

Second Embodiment

A second embodiment will now be described with reference to FIG. 5. The present embodiment differs from the first embodiment in that the liquid supply source is a fixed-shape container, which includes an atmospheric communication passage, instead of a flexible sealed container. Otherwise, the structure of the present embodiment is substantially the same as the first embodiment. Thus, the description will focus on the differences from the first embodiment and structures that are the same will not be described.

Figure 5:
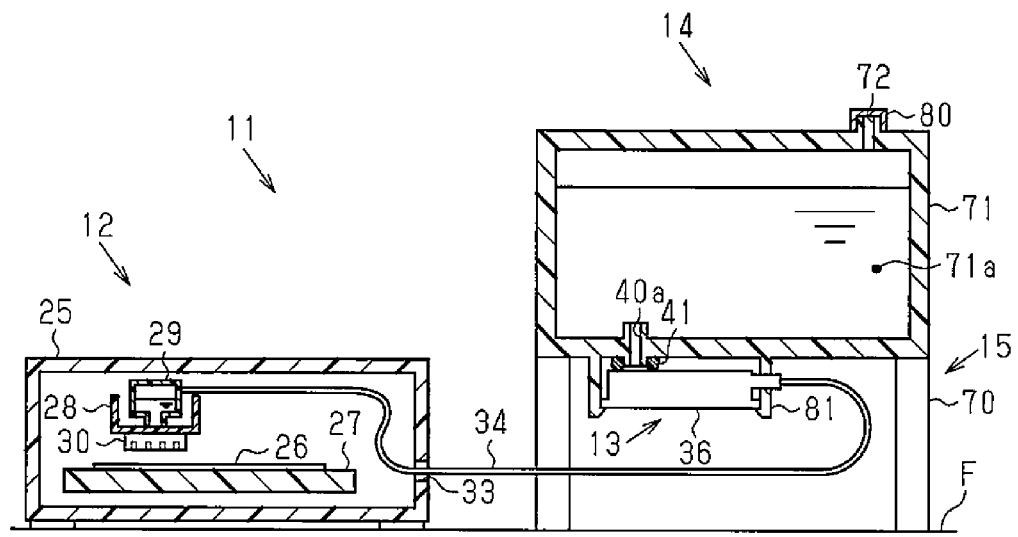
FIG. 5 is a schematic diagram of a second embodiment of a liquid ejection device and a liquid supply source.

As shown in FIG. 5, the present embodiment uses a liquid tank 71, which has a predetermined shape, as the liquid supply source. The liquid tank 71 is supported by a support base 70, which has a predetermined height and is located on the floor F beside the liquid ejection device 11. The liquid tank 71 includes a liquid storage 71*a*, which has a fixed volume and contains liquid. The liquid is supplied from the liquid storage 71*a* to the liquid ejection head 30 through the liquid supply unit 13. The liquid tank 71 includes a portion (upper wall of the tank in FIG. 5) including a liquid filler port 72. The filler port 72 is used when adding liquid to the liquid storage 71*a*. The filler port 72 may be sealed by a cap 80. The cap 80 is removed from the filler port 72 when adding the liquid.

The liquid tank 71 includes a wall (upper wall) located at a vertically upper position when supported by the support base 70. The upper wall of the liquid tank 71 includes an atmospheric communication passage (not shown), which connects the liquid storage 71*a* to the atmosphere. Thus, the surface of the liquid contained in the liquid storage 71*a* is in contact with the atmosphere. For example, the atmospheric communication passage is tortuous and has a small cross-sectional passage area to allow the passage of gas, such as the air, and restricts the passage of liquid, such as ink. Alternatively, an opening may extend through the upper wall of the liquid tank 71, and the opening may be covered by a filter member formed by a gas permeable film, which allows the passage of gas while restricting the passage of liquid.

Also, the liquid tank 71 includes a wall (lower wall) located at a vertically lower position when supported by the support base 70. The outer surface of the lower wall of the liquid tank 71 includes a hook 81. The hook 81 is capable of hooking and stably holding the pressure adjusting valve portion 36 of the liquid supply unit 13. Also, in this case, the heightwise position P of the film member 54 is set relative to the vertical heightwise position of the nozzle openings 31 of the liquid ejection head 30 so that the liquid may form a meniscus in each nozzle opening 31. For example, when the position of the pressure adjusting valve portion 36 is as shown in FIG. 5, the heightwise position P is located at the height of an outer surface of a middle portion of the film member 54. Additionally, the lower wall of the liquid tank 71 includes a portion that is vertically opposed to a liquid inlet (not shown) of the pressure adjusting valve portion 36, which is held by the hook 81. The portion of the lower wall of the liquid tank 71 includes the liquid supply port 40*a*, through which the liquid is discharged from the liquid storage 71*a* of the liquid tank 71. When surrounded and sealed by the seal member 41, the liquid supply port 40*a* and the liquid inlet of the pressure adjusting valve portion 36 are connected so that the liquid may be supplied and drawn.

The present embodiment has the advantages described below in addition to advantages (2), (5) of the first embodiment.

(7) The pressure adjusting valve portion 36, which functions to adjust the pressure of liquid, is located between the liquid tank 71 (liquid supply source) and the liquid ejection head 30. Thus, liquid tank 71 may be located without considering the difference in height between the surface of the liquid contained in the liquid storage 71*a* that is in contact with the air and the position of the nozzle openings 31 of the liquid ejection head 30. Even in this case, the pressure adjusting valve portion 36 functions to limit leakage of liquid from the nozzle openings 31 and the like. Thus, the liquid may be stably supplied from the liquid tank 71 to the liquid ejection head 30 without limitations in the capacity and type of the liquid tank 71.

(8) The liquid tank 71 includes the filler port 72. Thus, liquid may be added when the amount of liquid becomes insufficient.

Third Embodiment

A third embodiment will now be described with reference to FIG. 6. The present embodiment differs from the second embodiment in which the pressure adjusting valve portion 36 is located on the floor F and not the lower portion of the liquid tank 71. Otherwise, the structure of the present embodiment is substantially the same as the second embodiment. Thus, the description will focus on the differences from the second embodiment and structures that are the same will not be described.

Figure 6:
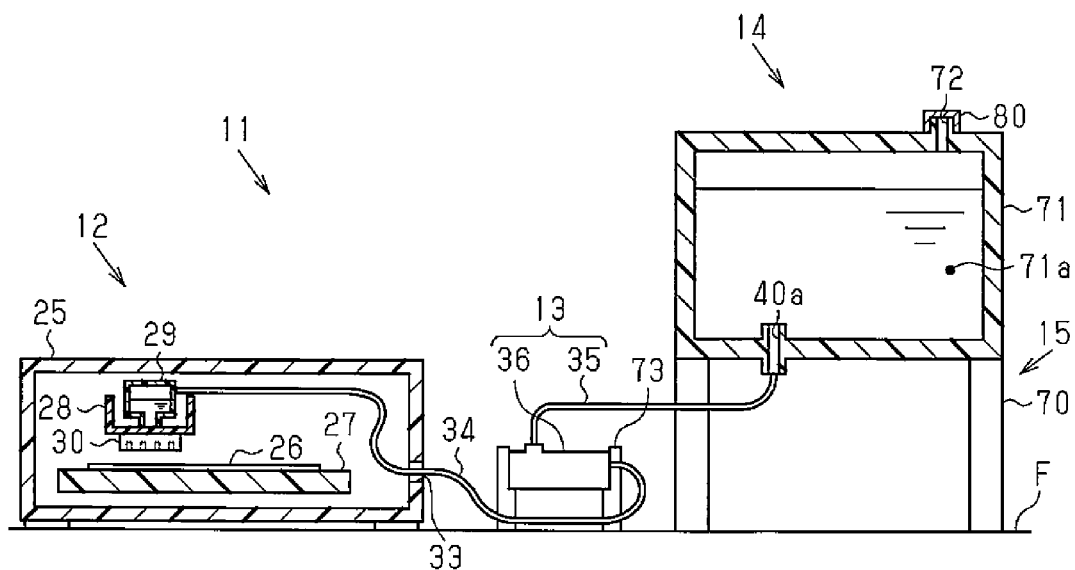
FIG. 6 is a schematic diagram of a third embodiment of a liquid ejection device and a liquid supply source.

As shown in FIG. 6, in the present embodiment, rod-shaped supports 73 are arranged on the floor F between the support base 70, which supports the liquid tank 71, and the case 25 of the liquid ejection device 11. The supports 73 hold the pressure adjusting valve portion 36 of the liquid supply unit 13 in a stationary manner at a position separated upward from the floor F. Also, in this case, the heightwise position P of the film member 54 relative to the vertical heightwise position of the nozzle openings 31 of the liquid ejection head 30 is set so that the liquid may form a meniscus in each nozzle opening 31. For example, when the position of the pressure adjusting valve portion 36 is as shown in FIG. 6, the heightwise position P is located at the height of the outer surface of the middle portion of the film member 54. The liquid guide 35, which is formed by a flexible tube or the like, connects the liquid inlet (not shown) of the pressure adjusting valve portion 36 and the liquid supply port 40a of the liquid tank 71.

The present embodiment has advantages (2), (5) of the first embodiment and advantages (7), (8) of the second embodiment.

Fourth Embodiment

A fourth embodiment will now be described with reference to FIG. 7. The present embodiment differs from the second embodiment in that a cartridge-type liquid container 75 is used as the liquid supply source instead of the liquid tank 71, which is of a stationary type and includes the filler port 72. The liquid container 75 may be removed and replaced by a new one. Otherwise, the structure of the present embodiment is substantially the same as the second embodiment. Thus, the description will focus on the differences from the second embodiment and the same structure will not be described.

Figure 7:
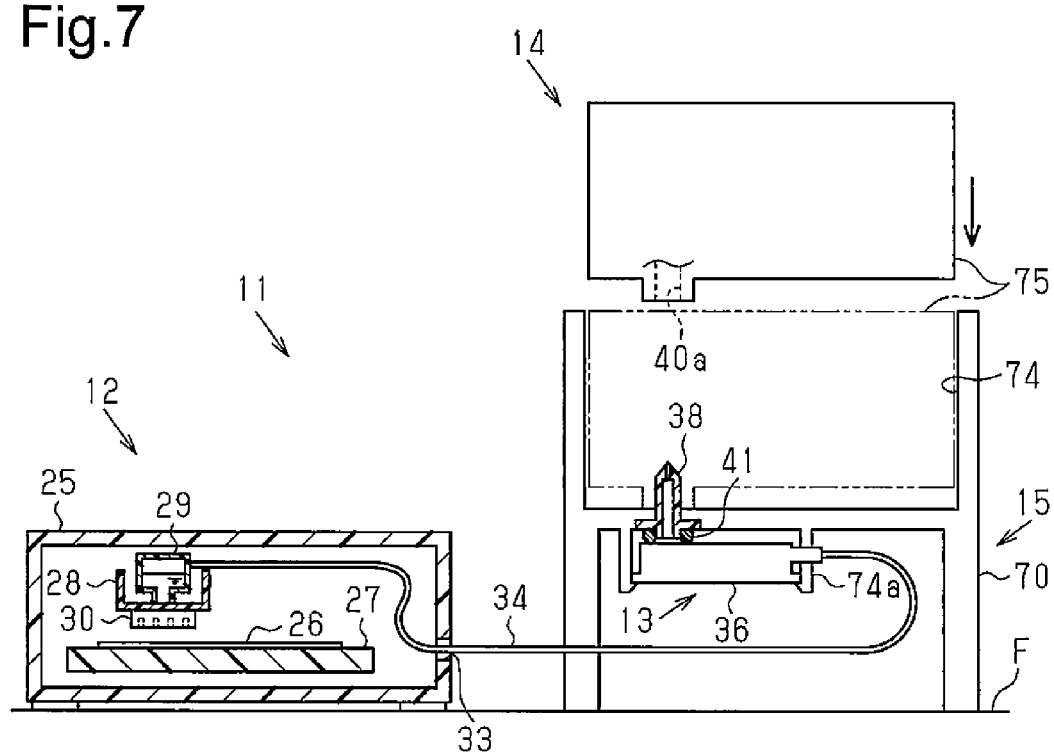
FIG. 7 is a schematic diagram of a fourth embodiment of a liquid ejection device and a liquid supply source.

As shown in FIG. 7, the present embodiment includes a liquid container receptacle 74 on the support base 70. The liquid container 75 is received in a removable manner to the liquid container receptacle 74 from above. The liquid container 75 includes a lower portion that includes the liquid supply port 40a. The liquid container receptacle 74 also includes a bottom wall including a lower surface. The lower surface of the bottom wall includes a hook 74a. When hooked on the hook 74a, the pressure adjusting valve portion 36 of the liquid supply unit 13 is held in a stationary manner.

Additionally, the liquid supply needle 38 is located in a portion of the bottom wall of the liquid container receptacle 74 that is vertically opposed to the liquid inlet (not shown) of the pressure adjusting valve portion 36, which is held by the hook 74a. The liquid supply needle 38 is arranged so that the distal end of the liquid supply needle 38 is directed upward in the liquid container receptacle 74. The lower end of the liquid supply needle 38 and the liquid inlet of the pressure adjusting valve portion 36 are connected when surrounded and sealed by the seal member 41. Thus, as shown in FIG. 7 by the solid lines and double-dashed lines, when the liquid container 75 is attached to the liquid container receptacle 74 from above, the liquid supply needle 38 is inserted into the liquid supply port 40a of the liquid container 75. This draws the liquid from the liquid container 75 toward the pressure adjusting valve portion 36.

The present embodiment has the advantages described below in addition to advantages (2), (3), (5) of the first embodiment and advantage (7) of the second embodiment.

(9) When the liquid container 75 runs out of liquid, the liquid container 75 may be removed and replaced by a new liquid container 75. Thus, the stable supply of liquid may be continued.

Fifth Embodiment

A fifth embodiment will now be described with reference to FIG. 8. The present embodiment differs from the first embodiment in that the liquid supply unit 13, which is formed by the pressure adjusting valve portion 36 and the like, is received in the liquid container receptacle 74, which is located in the case 25 of the device body 12. Otherwise, the structure of the present embodiment is substantially the same as the first embodiment. Thus, the description will focus on the differences from the first embodiment and the same structures will not be described.

Figure 8:
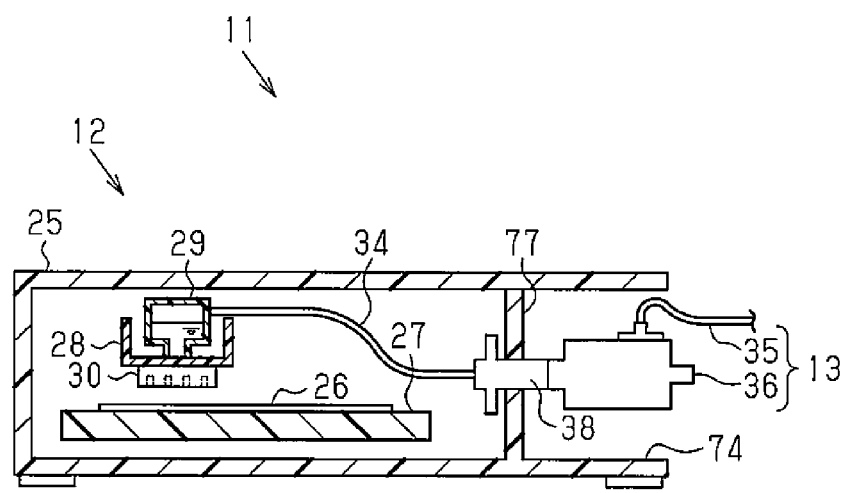
FIG. 8 is a schematic diagram of a fifth embodiment of a liquid ejection device and a liquid supply source.

As shown in FIG. 8, the liquid supply needle 38 is located in a partition wall 77, which is located at an inner side of the liquid container receptacle 74 of the liquid ejection device 11. The pressure adjusting valve portion 36 is held by the liquid supply needle 38 with the liquid supply needle 38 inserted into a liquid outlet of the pressure adjusting valve portion 36. Thus, when drawing liquid from the liquid supply source located outside the liquid ejection device 11 through the liquid guide 35, the pressure adjusting valve portion 36 supplies the liquid from the liquid supply needle 38 to the liquid ejection head 30 through the liquid supply tube 34 and the liquid reservoir 29.

The present embodiment has the advantages as follows in addition to advantages (1) to (6) of the first embodiment.

(10) In an existing liquid ejection device 11 including the liquid container receptacle 74 in a portion of the case 25, the liquid container receptacle 74 may be used to stably hold the liquid supply unit 13.

Sixth Embodiment

A sixth embodiment will now be described with reference to FIG. 9. The present embodiment differs from the fifth embodiment in that the liquid supply unit 13 including the liquid guide 35 and the pressure adjusting valve portion 36 is formed integrally with the liquid container 75. Otherwise, the structure of the present embodiment is substantially the same as the fifth embodiment. Thus, the description will focus on the differences from the fifth embodiment and the same structures will not be described.

Figure 9:
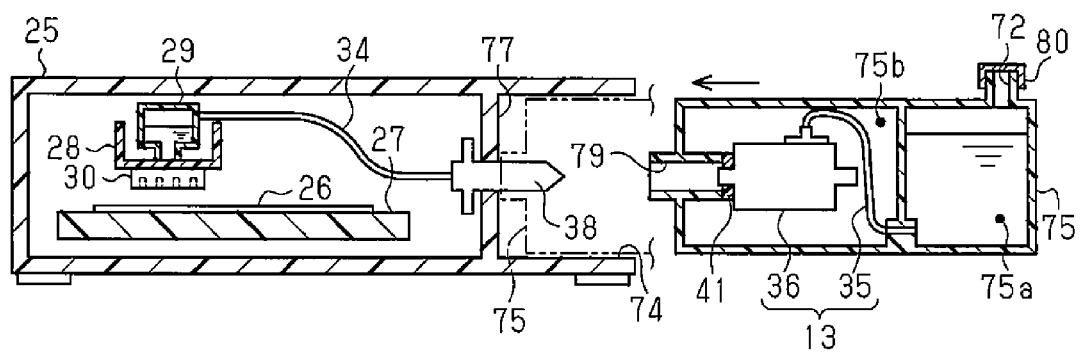
FIG. 9 is a schematic diagram of a sixth embodiment of a liquid ejection device and a liquid supply source.

As shown in FIG. 9, the liquid container 75 of the present embodiment includes an inner portion that is divided into two chambers, namely, a liquid storage 75a and a unit retainer 75b. The liquid storage 75a includes the filler port 72, which may be sealed by the cap 80. The unit retainer 75b includes a wall located at a side opposite to the liquid storage 75a. The wall includes a pipe 79 connecting the inside and outside of the unit retainer 75b. The pressure adjusting valve portion 36 of the liquid supply unit 13 is held by an inner end of the pipe 79 so that the inner end of the pipe 79 is in communication with the liquid outlet (not shown). Additionally, the liquid guide 35 of the liquid supply unit 13 is connected to the liquid storage 75a so that the liquid may be drawn from the liquid storage 75a. As shown in FIG. 9 by the solid lines and double-dashed lines, when the liquid container 75 is attached to the liquid container receptacle 74 from beside, the distal end of the liquid supply needle 38 is inserted into an outer end of the pipe 79. As a result, the liquid is supplied from the liquid storage 75a to the liquid ejection head 30 through the liquid supply unit 13, the liquid supply needle 38, the liquid supply tube 34, and the liquid reservoir 29.

The present embodiment has advantages (1) to (6) of the first embodiment.

Each of the above embodiments may be modified as follows.

In the first embodiment, the liquid guide 35 does not have to include the liquid guide tube 37. For example, the liquid inlet 53 and the liquid supply port 40a may be directly connected by the liquid supply needle 38 and the seal member 41.

In each of the first, third, fifth, and sixth embodiments, the liquid guide tube 37, which is the main component of the liquid guide 35, does not have to be flexible. For example, a hard pipe having a fixed shape may be used.

In the first to sixth embodiments, the opening-closing valve of the pressure adjusting valve portion 36 is not limited to a pressure reducing valve, which opens and closes in accordance with the difference between the pressure of the pressure chamber 51 and the atmospheric pressure. For example, a differential pressure valve may be used so that the valve opens and closes in accordance with the difference in pressure between the pressure chamber 51 and the liquid guide chamber 50.

The first to sixth embodiments do not necessarily have to include the liquid guide chamber 50. For example, the partition wall 49 and the communication hole 59 may be omitted. In this case, the valve body 45 may include only the pressure chamber 51 defined by the end plate 45a, the peripheral wall 45b, and the film member 54.

The first to sixth embodiments do not necessarily have to include the liquid reservoir 29. For example, the pressure adjusting valve portion 36 and the liquid ejection head 30 may be directly connected by the liquid supply tube 34.

The first to sixth embodiments may further include an urging member, such as a coil spring, at an outer side of the film member 54 of the pressure adjusting valve portion 36. The urging member urges the film member 54 in a direction in which the volume of the pressure chamber 51 decreases. In this case, a predetermined pressure to open the valve 62 may be changed by changing the urging force of the coil spring. This increases the degree of freedom for the position at which the pressure adjusting valve portion 36 is attached.

In the first to sixth embodiments, the pressure adjusting valve portion 36 does not have to include the separate holder 46. For example, the pressure adjusting valve portion 36 may be directly fixed to the outer surface of the case 25 of the device body 12 using a tape or the like. In this case, the part of the pressure adjusting valve portion 36 that is fixed by a tape corresponds to the holder.

In the first to sixth embodiments, when the liquid supply tube 34 is attached in a removable manner to the device body 12, the liquid supply unit may include the liquid supply tube 34.

In the first to sixth embodiments, when the liquid reservoir 29 and the liquid supply tube 34 are attached in a removable manner to the device body 12, the liquid supply unit may include the liquid reservoir 29 and the liquid supply tube 34.

In the first to sixth embodiments, the pressure receiving member 55 does not have to be cylindrical and include a closed end. For example, a thick disk may be used as the pressure receiving member 55.

In the first to sixth embodiments, the liquid ejection device 11 may be of a line head type, in which the liquid ejection head 30 does not scan the paper 26. In this case, the liquid supply tube 34 may be formed from a non-flexible material, such as a stainless pipe.

In the first to sixth embodiments, the liquid ejection device may eject or discharge liquid other than ink. When the liquid is discharged from the liquid ejection device in small amounts as droplets, the liquid may be grain-shaped, tear-shaped, or have a thread-like tail. Here, the liquid only needs to be a material that can be ejected from the liquid ejection device. For example, a substance only needs to be in a liquid phase. Thus, the liquid may be a fluid, such as a high or low viscosity liquid, sol, gel water, other inorganic or organic solvent agents, a liquid resin, or a liquid metal (metallic melt). Additionally, the liquid does not have to be a substance in a single phase and may be a substance obtained by dissolving, dispersing, or mixing particles of solid functional materials, such as, pigments or metallic particles, in a solvent. Representative examples of liquid are ink, which has been described in the embodiments, liquid crystal, and the like. Here, ink includes various kinds of liquid compositions, such as, general water-based ink and oil-based ink, gel ink, and hot-melt ink. A specific example of a liquid ejection device ejects liquid containing a dispersed or dissolved material, such as, an electrode material or a color material. Such liquid is used to manufacture, for example, a liquid crystal display, an electroluminescent (EL) display, a surface light emitting display, or a color filter. As another example, the liquid ejection device may eject a bioorganic substance used to manufacture biochips. Alternatively, the liquid ejection device may be used as a precision pipette to eject liquid serving as a sample. Alternatively, the liquid ejection device may be a printing device, a micro-dispenser, or the like. Further, the liquid ejection device may eject lubricant oil in a pinpoint manner to a precision instrument, such as a clock or a camera. The liquid ejection device may eject transparent resin liquid, such as, an ultraviolet cured resin, to a substrate to form a small hemispherical lens (optical lens) used for an optical communication element or the like. The liquid ejection device may eject an acid or alkali etching solution to etch a substrate or the like. The invention may be applied to one of the liquid ejection devices.

The present examples and embodiments are to be considered as illustrative and not restrictive, and the invention is not to be limited to the details given herein, but may be modified within the scope and equivalence of the appended claims.

What is claimed is:

1. A liquid supply unit configured to be connectable to a supply passage that supplies liquid to a liquid ejection head including a nozzle opening from which the liquid is ejected, the liquid supply unit comprising:
a pressure adjusting valve portion that includes:
a liquid outlet connectable to an upstream end of the supply passage;
a liquid inlet that draws in the liquid from a liquid supply source, which contains the liquid;
a pressure chamber connected to the liquid outlet and the liquid inlet, wherein the pressure chamber is at least partially formed by a flexible portion configured to be deformed when pressure of the pressure chamber changes; and an opening-closing valve configured to allow the liquid to be drawn from the liquid supply source to the pressure chamber through the liquid inlet in accordance with a deformation of the flexible portion.

2. The liquid supply unit according to claim 1, wherein the pressure adjusting valve portion includes a holder configured to hold the pressure adjusting valve portion on a liquid ejection unit that includes the liquid ejection head.

3. A liquid ejection device comprising:
the liquid supply unit according to claim 2; and
a liquid ejection unit that includes the liquid ejection head, wherein
the liquid ejection unit includes a case that accommodates the liquid ejection head, and the case includes
a holder that holds the holder of the liquid supply unit on an outside of the case.

4. The liquid supply unit according to claim 1, wherein the pressure adjusting valve portion is held so that a position of the flexible portion relative to a position of the nozzle opening in the vertical direction is in a range in which the liquid is able to form a meniscus in the nozzle opening.

5. The liquid supply unit according to claim 1, wherein the pressure adjusting valve portion is held so that the flexible portion is located at a lower position than the liquid inlet in the vertical direction.

6. The liquid supply unit according to claim 1, further comprising:
a liquid guide connected to the liquid inlet, wherein
the liquid guide is configured to guide the liquid supplied from the liquid supply source to the liquid inlet,
the liquid guide includes a liquid discharge member that is insertable into a liquid supply port of the liquid supply source, and
when the liquid discharge member is inserted into the liquid supply port, the liquid is discharged from the liquid supply port into the liquid guide.

7. The liquid supply unit according to claim 6, wherein the liquid guide includes a portion formed by a flexible tube.

8. The liquid supply unit according to claim 1, wherein the liquid supply source further includes a filler port, and the liquid is supplied to the liquid supply source through the filler port.

9. The liquid supply unit according to claim 8, wherein the pressure adjusting valve portion is held so that the flexible portion is located at a lower position than the filler port in the vertical direction.

10. A liquid ejection device comprising:
the liquid supply unit according to claim 1; and
a liquid ejection unit that includes the liquid ejection head.

11. The liquid ejection device according to claim 10, wherein
the liquid ejection unit includes a case that accommodates the liquid ejection head, and the case includes
a holder that holds the pressure adjusting valve portion of the liquid supply unit on the case, and
a through hole, through which an upstream portion of the supply passage extends.

12. The liquid supply unit according to claim 1,
wherein the pressure adjusting valve includes a lever configured to pivot about a pivot shaft in accordance with the deformation of the flexible portion, and
the opening-closing valve allows liquid to be drawn into the pressure chamber when the lever pivots.

13. The liquid supply unit according to claim 1,
wherein the pressure adjusting valve includes an urging member configured to urge the flexible portion in a direction in which the flexible portion increases a volume of the pressure chamber.

14. The liquid supply unit according to claim 1,
wherein the flexible portion comprises a thin film formed from a synthetic resin, and the thin film includes a deformable portion having a corrugated cross-section and configured to be deformed when pressure changes in the pressure chamber.

* * * * *